United States Patent [19]

Kaplan

[11] 4,423,284

[45] Dec. 27, 1983

[54] MOULDING DUCT

[76] Inventor: Steve E. Kaplan, 155 Overbrook Rd., Elyria, Ohio 44035

[21] Appl. No.: 384,783

[22] Filed: Jun. 4, 1982

[51] Int. Cl.³ .............................................. H02G 3/04
[52] U.S. Cl. ...................................... 174/101; 16/386; 52/221; 138/92
[58] Field of Search .................... 52/27, 221, 588, 716, 52/717, 718; 138/108, 128, 151, 156, 157; 174/48, 49, 72 C, 97, 101; 220/340, 335, 338, 339; 232/17; 339/23; 16/267, 356, 380, 386, DIG. 29

[56] References Cited

U.S. PATENT DOCUMENTS

| | | | |
|---|---|---|---|
| 2,296,599 | 9/1942 | Costello | 220/340 |
| 2,559,009 | 7/1951 | Coyle et al. | 220/340 |
| 3,546,360 | 12/1970 | Bailey | 174/48 |
| 3,593,468 | 7/1971 | Bustin | 52/27 |
| 3,721,762 | 3/1973 | Gooding | 174/48 |
| 3,786,171 | 1/1974 | Shira | 174/48 |
| 4,017,137 | 4/1977 | Parks | 339/21 |
| 4,037,900 | 7/1977 | Schmidger | 339/23 |
| 4,056,297 | 11/1977 | Gartung | 339/23 |
| 4,156,795 | 5/1979 | Lacan | 174/97 |
| 4,214,414 | 7/1980 | Wendt | 52/288 |
| 4,255,610 | 3/1981 | Textoris | 174/48 |
| 4,345,697 | 8/1982 | Wilson et al. | 220/335 |

FOREIGN PATENT DOCUMENTS

| | | | |
|---|---|---|---|
| 24252 | 4/1936 | Australia | 220/340 |
| 954804 | 9/1974 | Canada | 138/157 |

Primary Examiner—John W. Shepperd
Assistant Examiner—Mark Thronson
Attorney, Agent, or Firm—Fay & Sharpe

[57] ABSTRACT

A generally rectangular wiring raceway having the form of a moulding duct and capable of housing cable TV, telephone, computer, low voltage and other cables. The duct is designed such that it may be opened and closed for initial cable installation, for line inspections, servicing and the installation of additional cable. The raceway is comprised of an elongated back panel having a top leg and a bottom leg. The top leg has a snap engagement member and the bottom leg forms one part of a longitudinally extending hinge section. Additionally, an elongated front panel is provided. The front panel has a snap engagement member at its top for mating with the corresponding snap engagement member of the back panel. The front panel also has a longitudinally extending hinge member which mates with the corresponding longitudinally extending hinge section of the back panel. The hinge sections of both the back panel and front panel interlock such that when the duct is open the front panel lies in a plane substantially perpendicular to the back panel so that cables normally contained within the raceway may rest on and be supported by the inside of the front panel.

5 Claims, 6 Drawing Figures

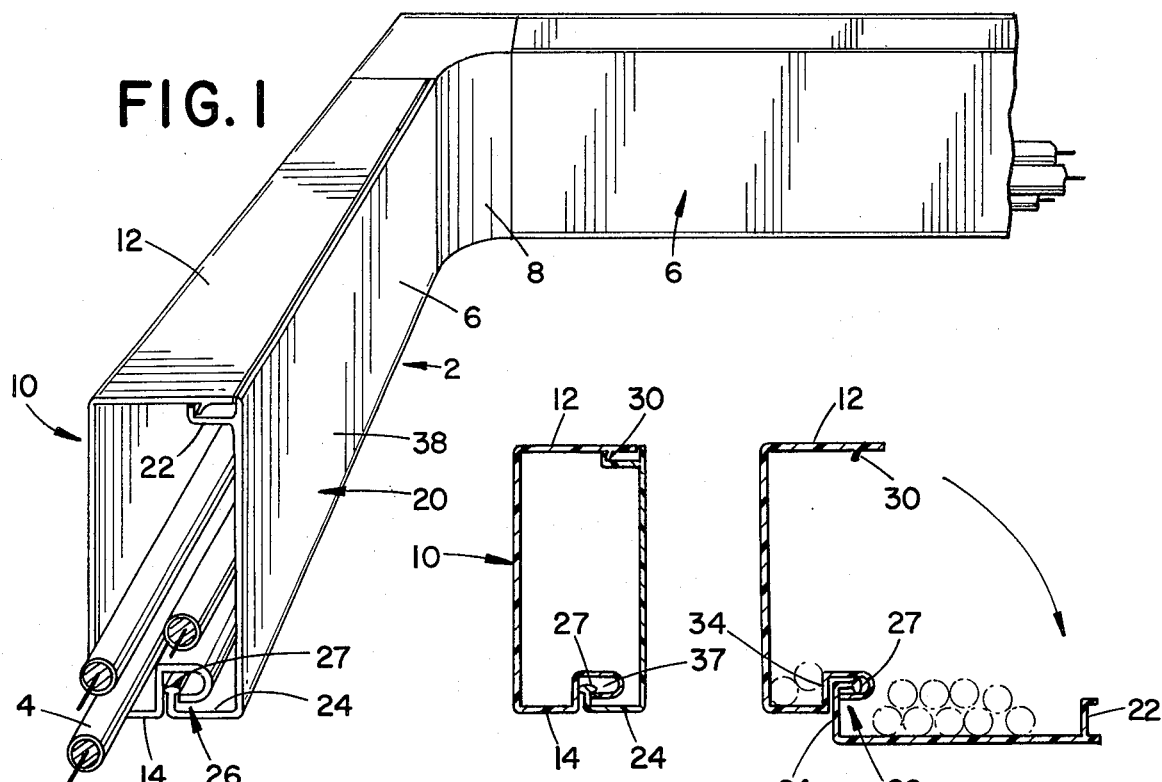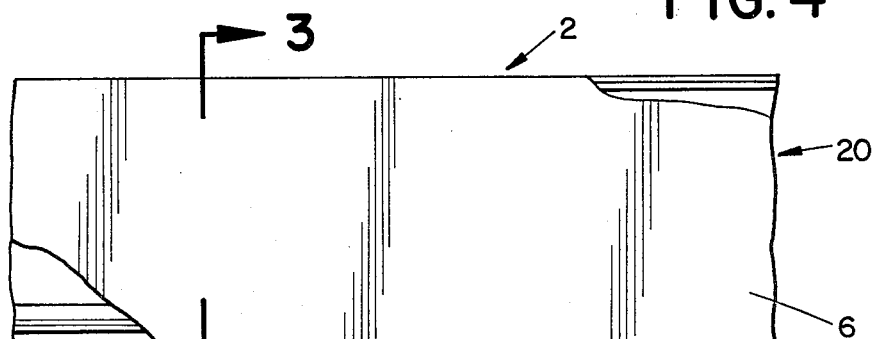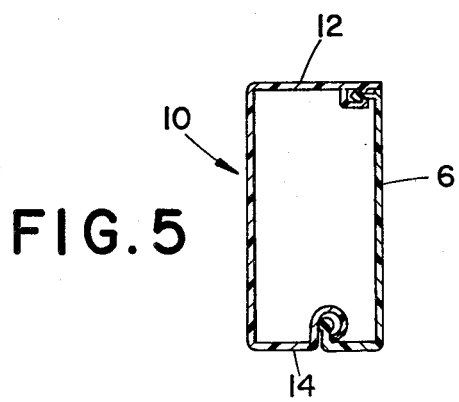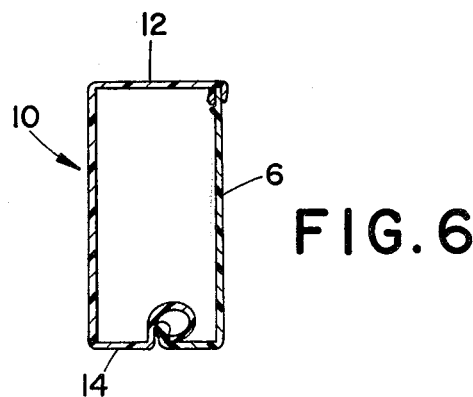

MOULDING DUCT

BACKGROUND OF THE INVENTION

Similar structures may be found in Patent Office sub-classes relating to electricity, conductors and insulators and, in particular, to wall mounted conduits.

DESCRIPTION OF THE PRIOR ART

A number of raceway systems have been employed in the cable TV industry. These systems have normally been inadequate for one reason or another. For instance, some systems were designed such that two separate mating pieces were required to complete the raceway and duct assembly. This necessarily involved additional labor at the job site during installation of the raceway.

The shape of raceways found in the prior art was often elliptical. Two problems developed as a result of the use of this configuration. First, the elliptical shape did not accommodate fittings well and, secondly, an excessive number of lines contained within the duct or raceway often caused the front cover to bulge and occasionally to pop open. In the past, the ducts or raceways could only be applied to a wall by common methods such as nailing and screws and no provision was made for an easy-to-use strippable adhesive backing.

Another of the problems found in prior art devices was that when they were opened for cable installation it was necessary for the installer to ackwardly attempt to hold a number of cables in the raceway with one hand while trying to attach the outer cover with the other hand. Furthermore, after installation of one of the prior art devices, if servicing was subsequently necessary and the front panel re-opened, the cables often fell out thereby requiring reinstallation.

Furthermore, in the devices found in the prior art, very little attention seems to have been paid to the asthetics of the moulding either in shape or in terms of matching the design of the walls and interior in which the ductwork was to have been installed.

SUMMARY OF THE INVENTION

Applicant's invention is a moulding duct, which forms a wiring raceway. The duct is designed such that it may be opened and closed and it is fully preassembled before arrival at the job site.

The duct is comprised of a main raceway body having a hinged snape closing cover. It is generally rectangular in shape and can be secured to a wall with any common method such as nails, screws, etc. It may also be secured to a wall by means of a pre-applied adhesive backing which is simply stripped at the job site to expose the adhesive and is subsequently easily secured in place.

The hinges are designed such that when the front cover is opened it locks in a position in which lines or cables do not fall from the raceway but are supported by the front panel. Thus, overhead loading of the raceway is no more difficult than floor level loading.

It is an object of applicant's invention to provide a raceway which opens easily for initial installation of lines, for installing additional lines and for servicing various components contained within the raceway and for line inspection.

It is a further object of applicant's invention to provide a raceway that stays securely closed by means of a snap closure member. Applicant's invention still further provides a moulding duct or raceway which is esthetically pleasing and which may be painted to match any room decor. It is yet a further object of the applicant's invention to provide a preassembled raceway which requires less labor at the job site to install.

Applicant has further provided a rectangularly shaped interior of the raceway in order to better accommodate splitters and couplers, and further to accommodate a fairly large number of CATV cables.

It is yet a further object of applicant's invention to provide a raceway which may be mated with curved or radius corner members so that the cables contained within the raceway are not unnecessarily bent or crimped when they are formed around corners in the installation.

The foregoing and other objects of this invention will become more fully apparent from the following detailed description when read in conjunction with the accompanying drawings.

BRIEF DESCRIPTION OF THE DRAWINGS

FIG. 1 is a pictorial view of applicant's raceway;

FIG. 2 is a front view of the raceway;

FIG. 3 is a cross-sectional view taken along lines 3—3 of FIG. 2;

FIG. 4 is an end cross-sectional view showing the raceway in open position;

FIG. 5 is an end cross section of a modification of the raceway;

FIG. 6 is yet a further modification in end cross section of the raceway.

DESCRIPTION OF THE PREFERRED EMBODIMENT

Referring now more particularly to the drawings wherein the showings are for the purpose of illustrating preferred embodiments of the invention only, and not for the purpose of limiting same, FIG. 1 shows the raceway 2 of the present invention. Shown contained within the raceway are CATV cables 4. The raceway as pictured also comprises not only straight section 6 but also corner section 8. As can be seen, the raceway is in the form of a moulding duct. It comprises a back panel 10 which is generally C-shaped in cross section. The back panel has a top leg 12 and a bottom leg 14.

The bottom leg portion of the back panel extends in a direction generally perpendicular to the back of the back panel. This is also true of the top leg 12. The top leg 12 ends in a snap closure member 30 while the bottom leg ends in a hinge section.

The moulding duct or raceway further comprises a front panel 20 which has a top snap closure member 22. The front panel has a bottom leg 24 terminating in a hinge member 26. The hinge member 26 comprises a longitudinally extending bead 27.

The just described elements of the raceway can also be readily seen in FIGS. 3 and 4 and in the modification embodiments of FIGS. 5 and 6.

The snap closure members 30 and 22 of the front and back panels are designed to interlock with each other when the unit is closed.

The unit may be easily opened since the ductwork is made of a resilient material. Opening the unit is accomplished by simply deflecting the front panel to disengage the snap closure members.

The hinge members of the unit are designed to interlock such that when the unit is in its open position, as shown in FIG. 4, the front panel lies in a plane substantially parallel with the bottom leg of the moulding duct. In this position it is also substantially perpendicular to the back of the back panel. It will also be seen from viewing FIG. 4 that the hinge members mate with each other so that the front panel is held in a substantially rigid position when opened, thereby facilitating the receipt of cables in such a manner that they are prevented from falling out of the raceway.

It will be appreciated that the cables may be placed on the inside of the front cover when initial installation is being done. This frees both hands of the installer to properly install the wiring or cables in the raceway without having to worry about them dropping to the floor. The configuration also allows the panel to be easily opened at a later time for the installation of additional cables or servicing the various components contained within the raceway without having previously installed cables fall from the raceway.

When the unit is opened, bottom leg 24 of the front panel locks against and abuts generally vertically extending hinge portion 34 of the bottom leg 14 of the back panel. The hinge section of the back panel, in overall configuration, is generally P-shaped. It can be seen that bead 27 extends generally longitudinally in a manner such that it is substantially parallel with the front face 38 of the front panel 20. It is thus able to interlock within the channel or hinge barrel section 37 of the back panel. It will be appreciated that this barrel section aslo runs in a substantially longitudinal direction and is essentially parallel to the linear dimension of the moulding duct. Thus, the mating hinge sections interlock and the hinge pin member 27 (above also referred to as a bead type structure), is held within the barrel section in the area in which the barrel section curves back upon itself.

With respect to the overall configuration of the moulding duct, the curved corner radius 8 is configured such that no tight bends need be made in the CATV cable thereby providing smoother signal flow since kinking of the cable is prevented.

Thus, applicant has provided a novel raceway in which the front cover section may be opened to lie substantially rigidly supported by hinge sections in a substantially horizontal plane for support of CATV cables. There has further been provided a snap closure at the top of the front cover and a corresponding snap closure member on the top leg of the back panel for selectively and lockingly engaging and disengaging the front and back panels in order to open the raceway. Given the configuration of the raceway and the manner in which provision has been made to support cables when the unit is opened, cables may be as easily installed overhead at a building site as they may be installed at floor level. With particular reference to FIGS. 5 and 6, two slight variations of the snap engagement members have been disclosed. Also disclosed in those figures are slightly varied configurations of the hinge sections.

Applicant's invention has thus been described in detail sufficient to enable one of ordinary skill in the art to make and use the same. Obviously, modifications and alterations in the preferred embodiments will occur to others upon a reading and understanding of the specification and drawings. All such alterations are to be considered as part of the invention insofar as they come within the scope of the claims.

What is claimed is:

1. A generally rectangular wiring raceway having a back panel with a back portion adapted to be secured to a wall and further having a top leg and a bottom leg extending substantially perpendicularly from said back portion and wherein said top leg terminates in a snap closure member and said bottom leg terminates in a first hinge member, said first hinge member being formed by extending the bottom leg in a predetermined distance from the back portion to a point at which the leg turns upwards toward said top leg in a direction substantially parallel to the back portion, then again perpendicularly outwardly from said back panel in a direction substantially parallel to said bottom leg, then in a curved fashion such that it folds back upon itself, thereby defining a channel open at the bottom for reception of a second hinge member;

a front panel having a top snap portion for engagement with the snap closure member of said top leg of said back panel and a bottom portion defining a second hinge member for reception in the first hinge member of the bottom leg of the back panel, said second hinge member being formed by extending a leg from the bottom of the front panel in a direction substantially perpendicular to said front panel a predetermined distance, said leg then angling upwardly in a direction substantially parallel to the front panel, said leg having a terminal portion, said second hinge member further having a longitudinally extending bead at its terminal portion, and wherein said bead is adapted for receipt in the first hinge member and wherein the portions of both hinge members running substantially parallel respectively to the back of the back panel and the front panel abut each other when the front panel is opened so as to hold the front panel in a position so that cables contained within the raceway may rest on the front panel when said raceway is opened.

2. The raceway of claim 1 wherein the second hinge member's longitudinally extending bead defines a hinge pin.

3. The raceway of claim 2 wherein the first hinge member defines a hinge barrel.

4. The raceway of claim 1 further comprising a radiused corner section dimensioned such that cables may be contained within the raceway and may be curved around corners thereby preventing kinking of said cables and providing smoother signal flow.

5. The wiring raceway of claim 1 wherein the raceway is adapted to contain CATV cables therewithin.

* * * * *